US011104389B2

(12) United States Patent
Ash

(10) Patent No.: US 11,104,389 B2
(45) Date of Patent: Aug. 31, 2021

(54) CLAMPING SYSTEM

(71) Applicant: Jeffrey William Ash, Newport Beach, CA (US)

(72) Inventor: Jeffrey William Ash, Newport Beach, CA (US)

( * ) Notice: Subject to any disclaimer, the term of this patent is extended or adjusted under 35 U.S.C. 154(b) by 145 days.

(21) Appl. No.: 15/984,374

(22) Filed: May 20, 2018

(65) Prior Publication Data

US 2019/0300072 A1   Oct. 3, 2019

Related U.S. Application Data

(60) Provisional application No. 62/651,159, filed on Mar. 31, 2018.

(51) Int. Cl.
*B62D 27/06* (2006.01)
*B62D 63/08* (2006.01)
(Continued)

(52) U.S. Cl.
CPC ............ *B62D 27/065* (2013.01); *B60G 9/00* (2013.01); *B60G 11/02* (2013.01); *B62D 21/02* (2013.01);
(Continued)

(58) Field of Classification Search
CPC ...... B60G 5/01; B60G 11/02; B60G 2204/15; B60G 2206/82; B60G 2204/43; B62D 27/065
See application file for complete search history.

(56) References Cited

U.S. PATENT DOCUMENTS 1,289,140 A * 12/1918 Ferris .................... B60G 11/12
267/271
1,662,327 A *  3/1928 Patten .................... B60G 11/36
267/235
(Continued)

FOREIGN PATENT DOCUMENTS

| WO | WO 9214003 | 8/1992 |
| WO | WO 0147651 A1 | 7/2001 |
| WO | WO 2012103448 A1 | 8/2012 |

OTHER PUBLICATIONS

Skyranger Wing Fold Installation Instructions, Issue 1.2, Updated to Issue 1.3 on Dec. 14, 2017.
(Continued)

*Primary Examiner* — Paul N Dickson
*Assistant Examiner* — Timothy Wilhelm
(74) *Attorney, Agent, or Firm* — Andrew S. Dallmann, P.C.

(57) ABSTRACT

A clamping system for mating an I-Beam frame to an undercarriage is disclosed. The clamping system utilizes clamping brackets to secure the undercarriage to the trailer frame. The undercarriage has adapter sides oriented perpendicular to the undercarriage adapter bottom. The clamping brackets have two portions oriented perpendicular to each other. Holes are located in the clamping brackets to receive bolts or screws. The trailer frame is aligned onto the undercarriage and positioned such that proper tongue weight is applied. The clamping brackets are rigidly installed on the clamping bracket sides. Clamping screws are installed into the clamping brackets and torqued to a value such that a compressive force is applied between the bottom of the I-Beam and the undercarriage adapter bottom. The compressive force applied prevents unwanted relative motion between the I-Beam frame and the undercarriage during use.

16 Claims, 7 Drawing Sheets

US 11,104,389 B2
Page 2

(51) Int. Cl.
  *B60G 9/00* (2006.01)
  *B62D 21/02* (2006.01)
  *B60G 11/02* (2006.01)

(52) U.S. Cl.
  CPC .......... *B62D 63/08* (2013.01); *B60G 2204/15* (2013.01); *B60G 2300/04* (2013.01)

(56) References Cited

U.S. PATENT DOCUMENTS

| | | | | |
|---|---|---|---|---|
| 2,206,444 A * | | 7/1940 | Beckwith | B60R 19/48 224/506 |
| 2,760,784 A * | | 8/1956 | Talbert | B60G 5/01 280/680 |
| 2,976,078 A * | | 3/1961 | Maidl | B60P 3/34 296/26.09 |
| 2,997,114 A * | | 8/1961 | Hines | A01D 29/00 171/116 |
| 3,175,706 A * | | 3/1965 | Mathers | B65G 67/00 414/557 |
| 3,471,165 A * | | 10/1969 | Raidel | B60G 5/04 280/687 |
| 3,554,596 A * | | 1/1971 | LeFevre | B62D 33/0604 296/190.05 |
| 3,730,548 A * | | 5/1973 | Thaxton | B60G 11/465 280/124.163 |
| 3,730,550 A * | | 5/1973 | Thaxton | B60G 11/465 280/124.163 |
| 3,844,579 A * | | 10/1974 | Cunha | B60G 11/34 280/86.75 |
| 4,065,153 A * | | 12/1977 | Pringle | B60G 9/003 280/86.5 |
| 4,334,697 A * | | 6/1982 | Deweese | B60G 21/055 280/124.107 |
| 4,397,478 A * | | 8/1983 | Jensen | B60G 11/465 267/31 |
| 4,417,426 A * | | 11/1983 | Meng | E04B 1/34352 52/126.7 |
| 4,505,010 A * | | 3/1985 | Arenhold | F16B 2/245 24/456 |
| 4,586,359 A * | | 5/1986 | Parks | B21D 1/14 269/71 |
| 4,872,653 A * | | 10/1989 | Chuchua | B60G 11/12 267/271 |
| 4,937,989 A | | 7/1990 | Miyares et al. | |
| 5,074,161 A * | | 12/1991 | Hancock | B62D 1/192 74/492 |
| 5,146,724 A | | 9/1992 | Angelo | |
| 5,255,611 A * | | 10/1993 | Schneider | B61F 5/24 105/199.2 |
| 5,271,638 A * | | 12/1993 | Yale | B60G 11/465 280/124.102 |
| 5,293,948 A * | | 3/1994 | Crabb | B62D 55/305 180/9.1 |
| 5,301,480 A * | | 4/1994 | Oyama | E04F 15/02482 52/126.6 |
| 5,303,946 A | | 4/1994 | Youmans et al. | |
| 5,403,032 A * | | 4/1995 | Hellwig | B60G 7/04 267/31 |
| 5,542,511 A * | | 8/1996 | Steiner | B60M 1/225 191/41 |
| 5,617,072 A * | | 4/1997 | McNeal | B62D 53/068 280/441 |
| 5,634,605 A * | | 6/1997 | Rubel | B60P 3/20 248/228.1 |
| 5,873,581 A * | | 2/1999 | Yale | B60G 11/465 280/124.163 |
| 5,989,374 A | | 11/1999 | Bull et al. | |
| 6,082,750 A * | | 7/2000 | Merkler | B60G 9/00 267/260 |
| 6,116,671 A | | 9/2000 | Schneider | |
| 6,139,092 A * | | 10/2000 | Doner | B60G 11/10 293/138 |
| 6,158,761 A * | | 12/2000 | King | B60D 1/01 280/495 |
| 6,264,231 B1 * | | 7/2001 | Scully | B60G 5/047 280/680 |
| 6,272,898 B1 * | | 8/2001 | Soyk | B21D 1/12 72/295 |
| 6,386,565 B1 * | | 5/2002 | Kugler | B60G 7/003 280/124.165 |
| 6,434,907 B1 * | | 8/2002 | Simboli | B62D 24/02 296/146.6 |
| 6,682,280 B1 * | | 1/2004 | Lindsay | B62D 21/12 410/100 |
| 6,709,014 B2 * | | 3/2004 | Svartz | B60G 11/27 280/124.116 |
| 6,764,087 B2 * | | 7/2004 | Assaf | B60G 11/04 267/242 |
| 7,093,882 B2 * | | 8/2006 | Lake | B60J 7/1621 292/113 |
| 7,100,933 B2 * | | 9/2006 | Zackovich | B60P 3/12 280/402 |
| 7,481,407 B2 * | | 1/2009 | Kim | B60G 17/019 248/225.11 |
| 7,611,107 B2 * | | 11/2009 | Howell | B62D 27/065 248/200 |
| 7,651,107 B1 * | | 1/2010 | Chapin | F16F 1/30 280/124.165 |
| 7,905,056 B2 * | | 3/2011 | Kornfield | E05D 15/24 49/197 |
| 8,261,845 B2 | | 9/2012 | Palen | |
| 8,511,929 B2 * | | 8/2013 | Raye | B60C 23/10 403/385 |
| 8,764,036 B2 * | | 7/2014 | Muckelrath | B60G 9/003 280/124.116 |
| 8,910,989 B1 * | | 12/2014 | Boltz | B62D 63/061 296/26.09 |
| 8,998,160 B1 * | | 4/2015 | Vanwey | B65G 21/02 248/354.5 |
| 9,090,294 B2 | | 7/2015 | Johnson et al. | |
| 9,555,844 B2 * | | 1/2017 | Hicks | B62D 53/068 |
| 9,677,585 B2 * | | 6/2017 | Broussard | F16B 7/0493 |
| 10,100,861 B2 * | | 10/2018 | Zhang | F16B 7/0493 |
| 10,370,033 B1 * | | 8/2019 | Klein | B62D 53/068 |
| 2005/0093286 A1 * | | 5/2005 | Oh | B60G 15/068 280/788 |
| 2010/0320658 A1 * | | 12/2010 | Mueller | F16F 1/22 267/151 |
| 2012/0086194 A1 | | 4/2012 | Carrier | |
| 2019/0092407 A1 * | | 3/2019 | Jacobsma | B60G 5/005 |

OTHER PUBLICATIONS

Boss Products. Universal Undercarriage Mounting Instructions (Part No. LTA07667B).

* cited by examiner

CLAMPING SYSTEM

CROSS-REFERENCE TO RELATED APPLICATIONS

This application is related to and claims priority under 35 U.S.C. § 119 to U.S. Provisional Patent Application Ser. No. 62/651,159 filed Mar. 31, 2018, which is incorporated herein in its entirety by reference.

FIELD OF THE INVENTION

The present invention pertains generally to a novel clamping system used to attach an undercarriage to a body. The present invention is particularly, but not exclusively, useful as a way to reduce assembly time of the undercarriage to the body while providing for post-manufacture adjustment of the undercarriage to the body.

BACKGROUND OF THE INVENTION

For almost as long as there have been vehicles, there have been things designed to be towed behind them. In the most basic concept of a wheeled platform designed to be towed, history is filled with many designs, including the two-wheeled Roman chariots and the four-wheeled horse drawn wagon trains that traveled the interior of the United States during the 1800's. When these trailers were assembled, the position of the wheels relative to the rest of the body was fixed. In today's modern manufacturing of trailers, each trailer component, such as the undercarriage and the body, are welded together from individual pieces of material. Since the body of the trailer will need to hold up under the load placed on it, both the body and the undercarriage must be designed to carry the intended load.

During the typical manufacture of a trailer, the body is constructed from lengths of metal that are welded together in various patterns depending on the intended use of the trailer. Each weld required to assemble the body takes a certain amount of time. The metal pieces must be prepared for welding, the pieces must be oriented properly and held in place, and then the actual weld needs to be performed.

Trailers have a tongue located at the front of the trailer. The tongue has a coupler that is used to attach the trailer to the tow vehicle. When the trailer is attached to the vehicle, the tongue of the trailer will apply some of the trailer's weight to the tow vehicles attachment point or hitch. "Tongue weight" is the amount of the loaded trailer's weight that presses down on the towing hitch. To put it another way, the trailer acts like a lever, and the axle of the trailer is the fulcrum, or pivot point, for the lever. If the tongue is too light, cargo needs to be moved forward of the trailer's axle. If the tongue is too heavy, cargo needs to be moved so that more of the weight is behind the trailer's axle. It is like trying to balance the weight of two kids on a seesaw at the playground.

In a typical trailer setup, the tongue weight should be about 10% to 15% of the combined weight of the trailer and its load. If the tongue weight is too light, the trailer will tend to sway or fishtail from side-to-side, which can be very dangerous, especially at highway speeds. If the tongue weight is too heavy, the rear wheels of the towing vehicle will be weighted down, making it difficult to steer through corners and curves, harder to stop, and less fuel efficient.

Proper tongue weight is very important. Since 1975, there have been more than 19,500 trailer-related fatalities. Since 1988, reported injuries have surpassed 800,000 and over 2 million vehicles, boats, trailers, and other property have been damaged or totaled (Source: dangeroustrailers.org). The importance of proper tongue weight when towing a trailer cannot be underestimated.

How much tongue weight is applied to the hitch depends on the placement of the undercarriage relative to the body of the trailer. If the undercarriage is located exactly at the center of the trailer, the trailer will apply little to no tongue weight to the hitch since all of the trailer weight is evenly placed on the undercarriage. As the undercarriage is moved toward the rear of the body, the weight of the body will start to be spread between the undercarriage and the tongue. Tongue weight will be at its maximum when the undercarriage is moved to the very rear of the body.

During manufacture of a typical trailer, the manufacturer will typically set up to manufacture multiples of one trailer configuration. During this production run, the location of the undercarriage is fixed relative to the body. After a run is complete, the assembly line needs to be restocked with the proper sized parts for the next trailer configuration.

Recent changes in trailer design have led to the introduction of I-Beam shaped material being used in the design of the trailer body. I-Beams can be made out of different grades of steel or even aluminum, depending on the design needs of the trailer. Aluminum is advantageous since it is lighter than steel while providing good strength. Once an I-Beam frame is formed, other support structures can be mounted onto the I-Beam to allow for a load to be carried on the trailer.

The many surfaces of an I-Beam provide trailer manufacturers with several options for mounting together all of the individual pieces that make up the trailer. This allows manufacturers more flexibility during the manufacture process since an I-Beam only needs to be cut to the proper length then allowing other items to be attached to the beam as needed. This reduces the manufacturer's need to set up for different manufacturing runs of different trailer sizes since only the length of the I-Beam needs to be changed.

If the trailer attaches to a hitch located at the rear of the vehicle, tongue weight applied to the vehicle will be felt almost exclusively on the vehicle's rear suspension. If the tow vehicle uses a fifth-wheel type hitch, which is typically mounted near the center of the vehicle, the tongue weight is spread more evenly over the vehicle's suspension. However, a fifth-wheel hitch is usually reserved for very large trailers since it requires the permanent installation of the fifth-wheel hitch onto a vehicle such that the vehicle loses most of its utility value and becomes almost a dedicated towing vehicle.

For the typical consumer, most trailers are manufactured for a specific purpose. There are trailers used to move boats, motorcycles, jet skis, cars, and personal goods. At the time of manufacture, the location of the undercarriage relative to the frame is set. Most of the time, the undercarriage assembly is welded to the body thereby permanently setting the relationship between the undercarriage and the frame. This makes it more difficult for trailer users to property position the load on the trailer so that proper tongue weight is applied to the tow vehicle.

What is needed is a clamping system designed to be used with an I-beam trailer body that allows the undercarriage to be quickly and easily affixed to the body over a range that allows for better control of the tongue weight and also allows for increased manufacturing efficiency.

SUMMARY OF THE INVENTION

The present invention is a clamping system used to mate a frame to an undercarriage. In some embodiments, the frame is constructed from an I-Beam having at least a bottom portion that has a bottom surface. The clamping system of the present invention allows for the quick and easy relocating of the undercarriage relative to the frame thereby allowing for, but not limited to, quick and easy adjustment of a trailer's tongue weight. The clamping system utilizes one or more clamping brackets to removably attach the undercarriage to the frame.

The clamping brackets are formed with a first portion and a second portion with the second portion at a clamping bracket angle with respect to the first portion. The clamping brackets are equipped to enable the use of fasteners to removably connect the clamping brackets to both the undercarriage and the frame. In one embodiment, the clamping brackets are equipped with bolt holes on one portion and threaded holes on another portion, where the two portions of the brackets are essentially perpendicular to each other.

The undercarriage adapter comprises an undercarriage adapter bottom and at least one undercarriage adapter side formed at an undercarriage adapter angle with respect to the bottom. If more than one undercarriage adapter side is used, the bottom of the undercarriage adapter extends along and between the undercarriage adapter sides.

In use, the frame is aligned onto the undercarriage bottom. A clamping bracket is then placed such that a first portion of the bracket contacts the undercarriage adapter side and a second portion of the bracket is proximate to a top portion of the frame such that the frame is located between the second portion of the clamping bracket and the undercarriage adapter bottom. The first portion of the clamping bracket is then rigidly attached to the undercarriage adapter side. Clamping screws are then inserted into the second portion of the clamping bracket. Lastly, the clamping screws are torqued to a value that will prevent any relative motion between the frame and the undercarriage during use.

The clamping system can be used with any type of undercarriage. For example, a typical small trailer has a single axle. This axle is attached, either directly or through suspension elements, to the undercarriage adapter. In this case, the undercarriage adapter comprises two sides thereby allowing the use of two clamping brackets to attach the undercarriage to the frame. This setup is repeated on the other side of the trailer with another undercarriage adapter. The combination of the two undercarriage adapters, one located on each side of the trailer, allows for the undercarriage to be mounted to the frame such that any relative motion between them is prevented.

For multi-axle trailers, each undercarriage adapter has a number of sides equaling the number of axles plus one. For example, a five axle trailer will have 6 sides per undercarriage adapter. This means that 6 clamping brackets are also used per undercarriage adapter. A four axle trailer will have 5 sides per undercarriage adapter and will use 5 clamping brackets per undercarriage adapter.

The clamping system of the present invention may also be used with non-axle implementations. For example, if a frame needs to be mounted to a floating pontoon system, the undercarriage adapter will have one or more sides capable of receiving a clamping bracket.

Manufacturing times of a trailer are greatly reduced through the use of the clamping system of the present invention. Other methods of manufacturing a trailer require the implementation of numerous welds to affix the undercarriage to the frame. The present invention greatly reduces the number of welds required to build a trailer thereby greatly reducing manufacturing times. The present invention also allows for an undercarriage to be mated to a frame without much regard to the tongue weight. After manufacture, the clamping system allows for the quick and easy repositioning of the undercarriage relative to the frame thereby setting the trailer's tongue weight to the desired amount. Further, the present invention allows for a complete undercarriage to be changed out with a new undercarriage without the need to cut existing welds then re-weld the new undercarriage to the existing frame.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
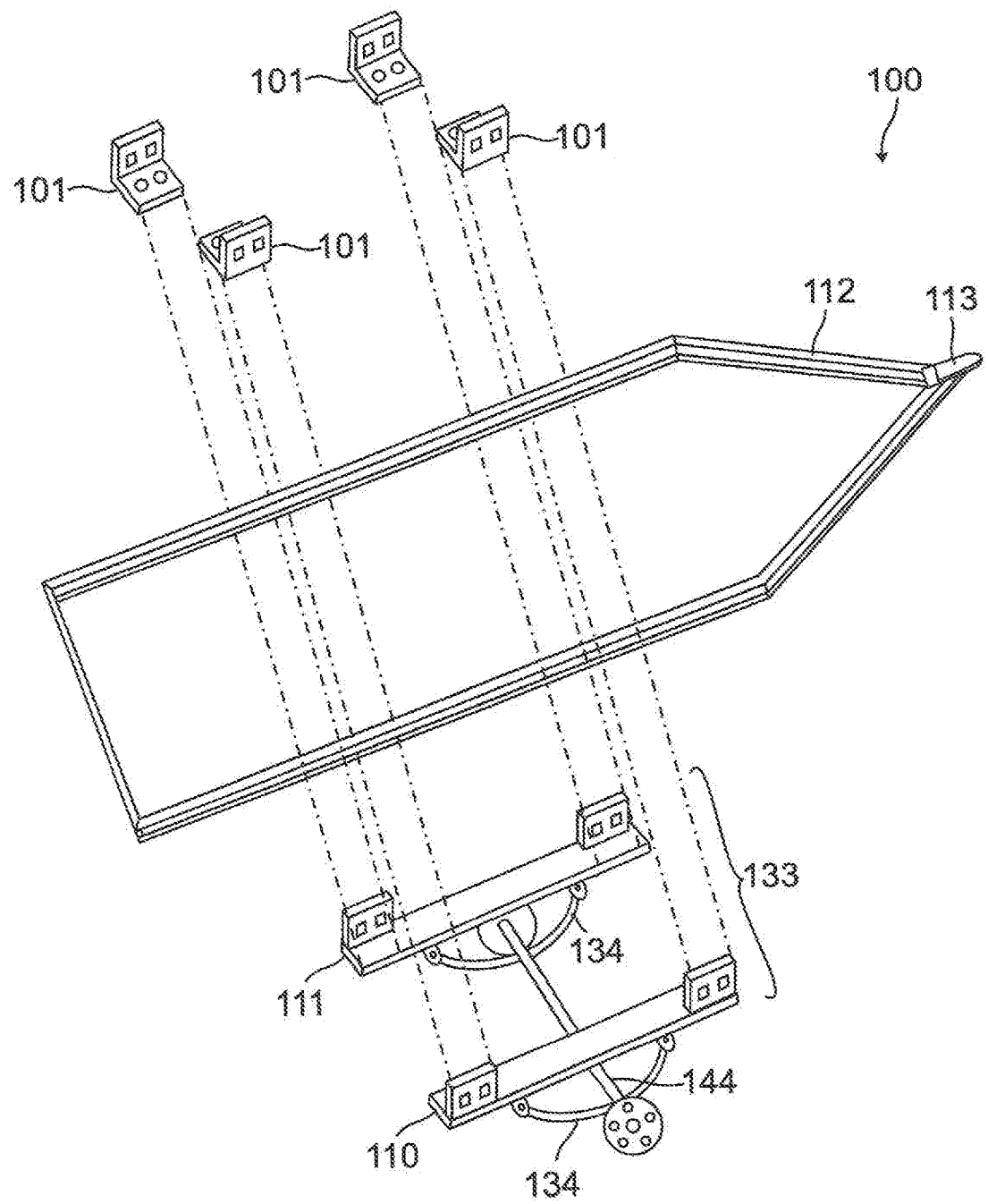
FIG. 1 is an exploded perspective view of a single axle trailer using the clamping system.

Referring initially to FIG. 1, a trailer is shown and generally referred to as trailer 100. Trailer 100 comprises I-Beam frame 112 having tongue 113 located at the front of I-Beam frame 112. Tongue 113 serves as the attachment point when trailer 100 is attached to a vehicle (not shown) for towing. The method of attachment may be a coupler attached to a ball hitch on the vehicle, however this method of attachment is not meant to be limiting and alternative methods of attachment are fully contemplated by the inventor. Trailer 100 further comprises undercarriage 133 and clamping brackets 101. Undercarriage 133 comprises, and will be discussed below in more detail, first undercarriage adapter 110 and second carriage adapter 111. Attached to the bottom of both the first and second carriage adapter 110 and 111 are leaf springs 134, which in turn connect to axle 144. As will be discussed in more detail below, undercarriage 133 is clamped to I-Beam frame 112 using clamping brackets 101.

It should be noted that the use of an I-Beam is only exemplary and should not be considered limiting. The present invention utilizes a compressive force between a portion of the frame and the undercarriage adapter to prevent any relative motion between the two. Other frame types may be used without departing from the spirit and intent of the present invention as long as the frame has a portion that can be clamped between a bracket and the undercarriage adapter.

It should be appreciated by someone skilled in the art that axle 144 may be connected directly to the undercarriage adapters with the use of a suspension element, such as the leaf spring 134. This configuration may be used with smaller trailers that do not need the benefits of a suspension. This configuration may also be used with axles that have suspension elements built into the axle itself thereby obviating the need for the external suspension elements such as leaf springs 134. In this configuration, the undercarriage adapters 110 and 111 would be configured to receive the axle 144 directly onto the undercarriage adapters 110 and 111.

Figure 2:
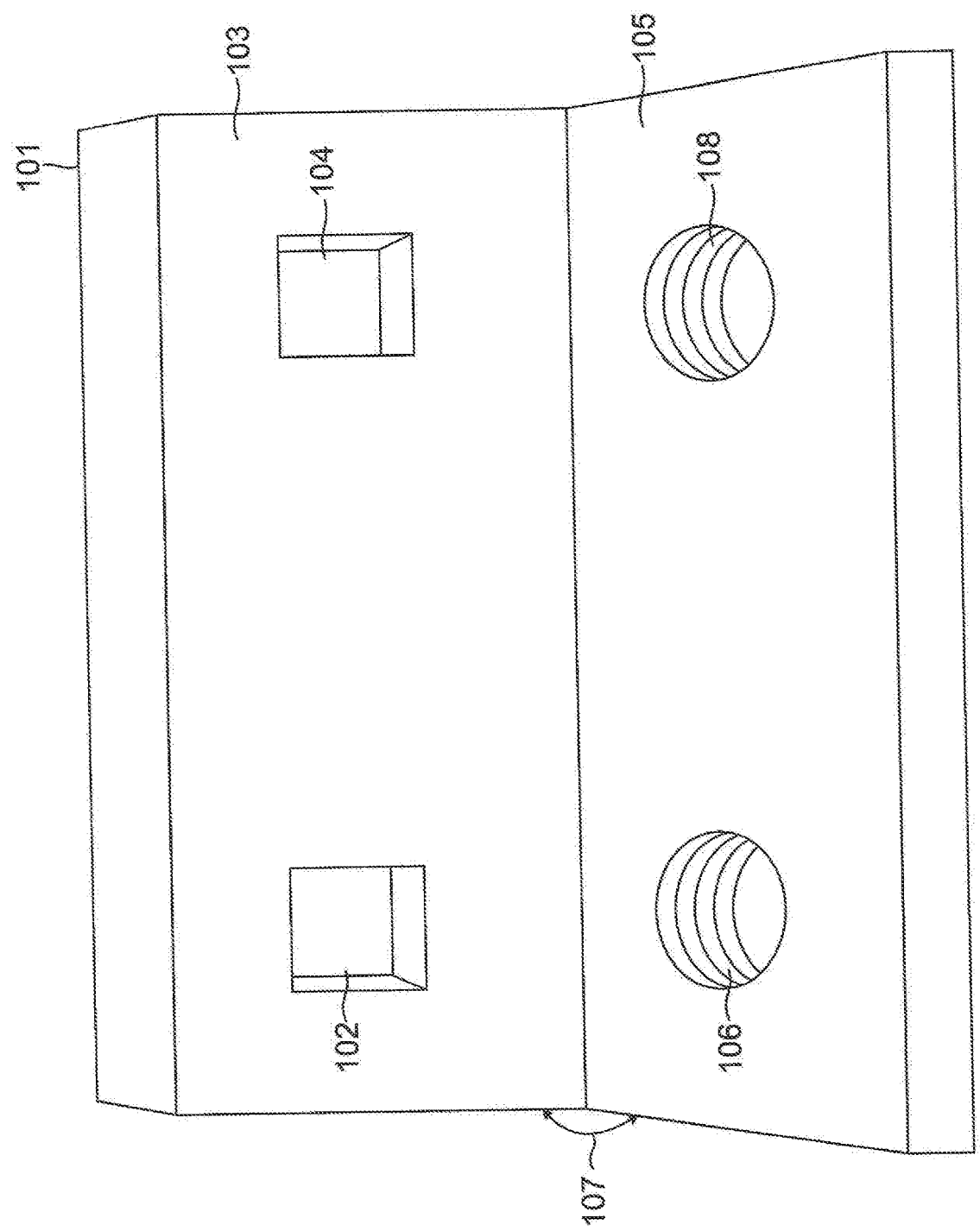
FIG. 2 is a front view of a clamping bracket.

Referring now to FIG. 2, a front view of clamping bracket 101 is shown. Clamping bracket 101 comprises a first portion 103 and a second portion 105 where the second portion 105 is formed at a clamping bracket angle with respect to the first portion 103. In FIG. 2, the clamping bracket angle is shown at approximately a right angle. This right angle configuration is merely exemplary and should not be considered limiting. For example, clamping bracket angle may be oriented at 85 degrees, or some other angle required by the design of the frame and undercarriage adapter 110. As set forth more fully below, the clamping bracket angle should be set to ensure that the clamping bracket is properly positioned with respect to the undercarriage adapter side 132 (see FIG. 3) and the frame 112 when in use.

Located on first portion 103 are first bolt hole 102 and second bolt hole 104. In this figure, first and second bolt holes 102 and 104 are formed in the shape of a square. This will allow for the use of any square shouldered connector, such as a threaded square shoulder bolt, to minimize any relative motion between the clamping bracket 101 and the undercarriage 133. However, the use of square bolt holes should not be considered limiting.

Located on second portion 105 are first clamping screw hole 106 and second clamping screw hole 108. Holes 106 and 108 are threaded to allow for the use of clamping screws 114 (see FIG. 3), discussed in more detail below, to secure undercarriage 133 to I-Beam frame 112.

Figure 3:
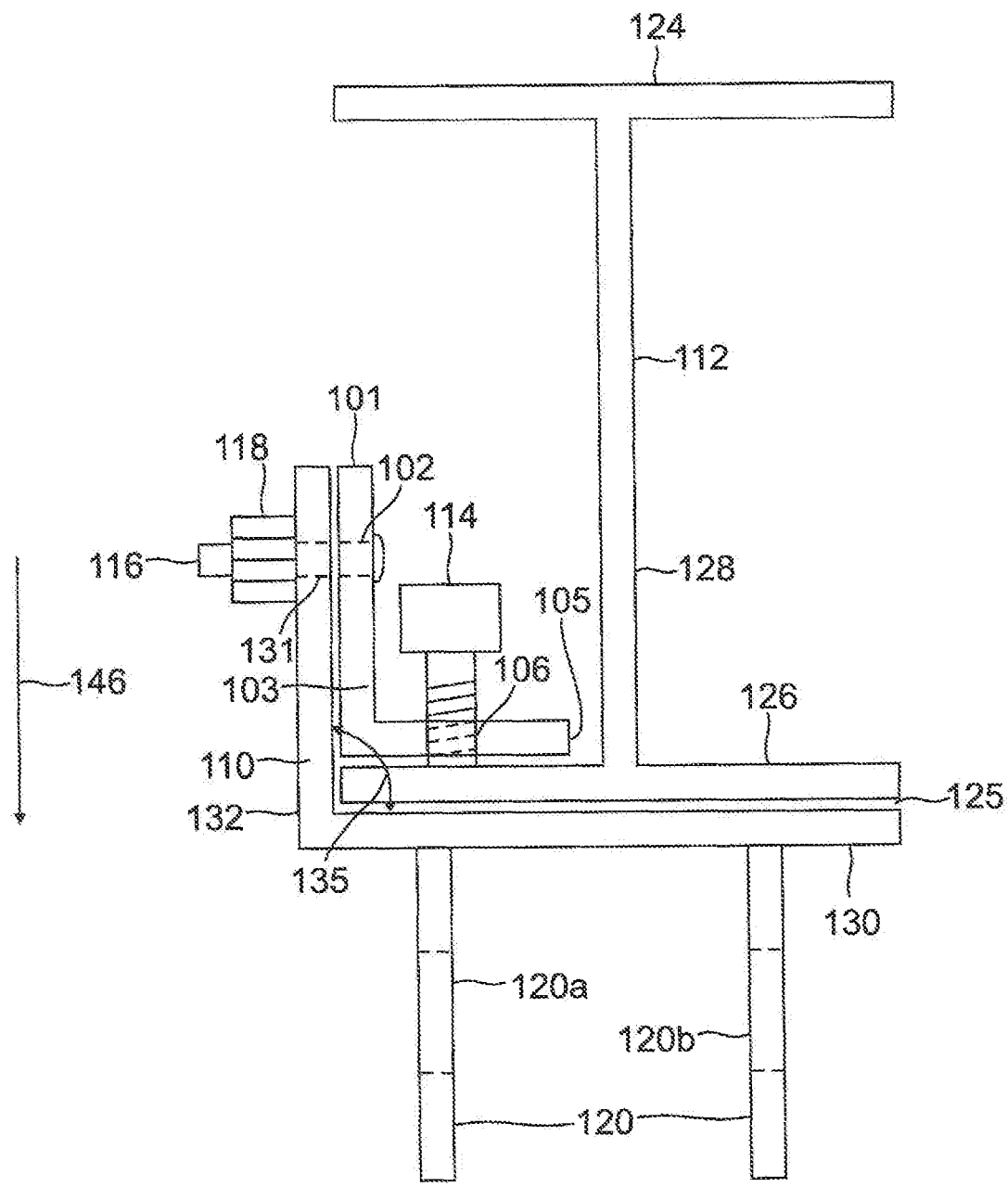
FIG. 3 is an end view of the clamping system assembled.

Moving now to FIG. 3, an end view of the clamping system in an exemplary assembled condition is shown. I-Beam frame 112 comprises a top 124, bottom 125, inside bottom 126, and middle 128. Top and bottom 124 and 125 are parallel to each other and middle 128 connects to the centerline of top 124 and bottom 125 at approximately a right angle. Although the frame shown in FIG. 3 is an I-Beam frame 112, it is to be appreciated by those skilled in the art that the present invention is compatible with any frame with a top opposite a bottom. Undercarriage adapter 110 comprises undercarriage adapter bottom 130 and undercarriage adapter side 132 formed at an undercarriage adapter angle 135 with respect to the undercarriage adapter bottom 130.

It is to be appreciated by those skilled in the art that the undercarriage adapter 110 can be formed with one or more undercarriage adapter sides 132. In the exemplary embodiment shown in FIG. 3, I-Beam bottom 125 is coplanar with undercarriage adapter bottom 130 and the first portion 103 of clamping bracket 101 is also coplanar with undercarriage adapter side 132. In the exemplary embodiment shown in FIG. 3, the undercarriage adapter angle 135 is ninety (90) degrees since the clamping bracket angle is also shown at 90 degrees. However, the clamping bracket angle and undercarriage adapter angle 135 shown is not to be considered limiting since the clamping system of the present invention will function as intended as long as the two angles are set to ensure that the undercarriage adapter bottom 130 and I-Beam bottom 125 are coplanar and the first portion 103 of clamping bracket 101 and undercarriage adapter side 132, are also coplanar.

Clamping bracket 101 attaches to undercarriage adapter side 132 using carriage bolt 116 disposed through bolt hole 102 and hole 131 using carriage nut 118. It is to be appreciated by one skilled in the art that one or more additional carriage bolts (not shown) and corresponding carriage nuts (not shown) may also be used to attach clamping bracket 101 to the undercarriage adapter side 132. It is to be further appreciated that any number of different fasteners known in the art may be utilized to removably connect the first portion 103 to the undercarriage adapter side 132. After installation of carriage bolt 116, clamping bracket 101 is rigidly held to undercarriage adapter side 132. Clamping screw 114 is then inserted through the threaded clamping screw hole 106. As clamping screw 114 is rotated, the end of screw 114 makes contact with the I-Beam inside bottom 126. As clamping screw 114 is further rotated, it presses the I-Beam bottom 125 in direction 146 tightly against the undercarriage adapter bottom 130. The more torque applied to clamping screw 114, the tighter I-Beam bottom 125, and also therefore I-Beam frame 112, is secured to the undercarriage adapter 110. It should be appreciated by someone skilled in the art that a second clamping screw (not shown) is used to secure clamping bracket 101 to I-Beam 112 through second clamping screw hole 108, however the use of two clamping screws 114 should not be considered limiting. For instance, a larger clamping bracket may require three (3) or more clamping screws to adequately secure the undercarriage 133 to the I-Beam frame 112.

In an alternative embodiment, if more threads are required than can be provided within the thickness of second portion 105 to allow for the application of the required torque for clamping screw 114, a threaded riser may be attached to the second portion 105 and mounted in-line with holes 106 and 108 of clamping bracket 101. A threaded riser (not shown) will allow for more torque to be applied to clamping screw 114 (see FIG. 3) than without the threaded riser since clamping screw 114 will have more threads with which to engage. The amount of torque required may vary depending on the size and load capacity of the trailer. For larger and heavier trailers, more torque may be required to properly secure the I-Beam frame 112 to the undercarriage adapters 110 and 111 thereby requiring additional threads for the clamping screw 114 to engage with during use.

Undercarriage adapter 110 further includes front shackle arm 120. Front shackle arm 120 comprises first front shackle arm 120a and second front shackle arm 120b. Shackle arm 120 and rear shackle arm 121 (see FIG. 4) are used in conjunction to adapt a spring type suspension and axle, which will discussed in more detail below. It should be appreciated by someone skilled in the art that undercarriage adapter 110 may be configured to attach to an axle without a suspension system.

Figure 4:
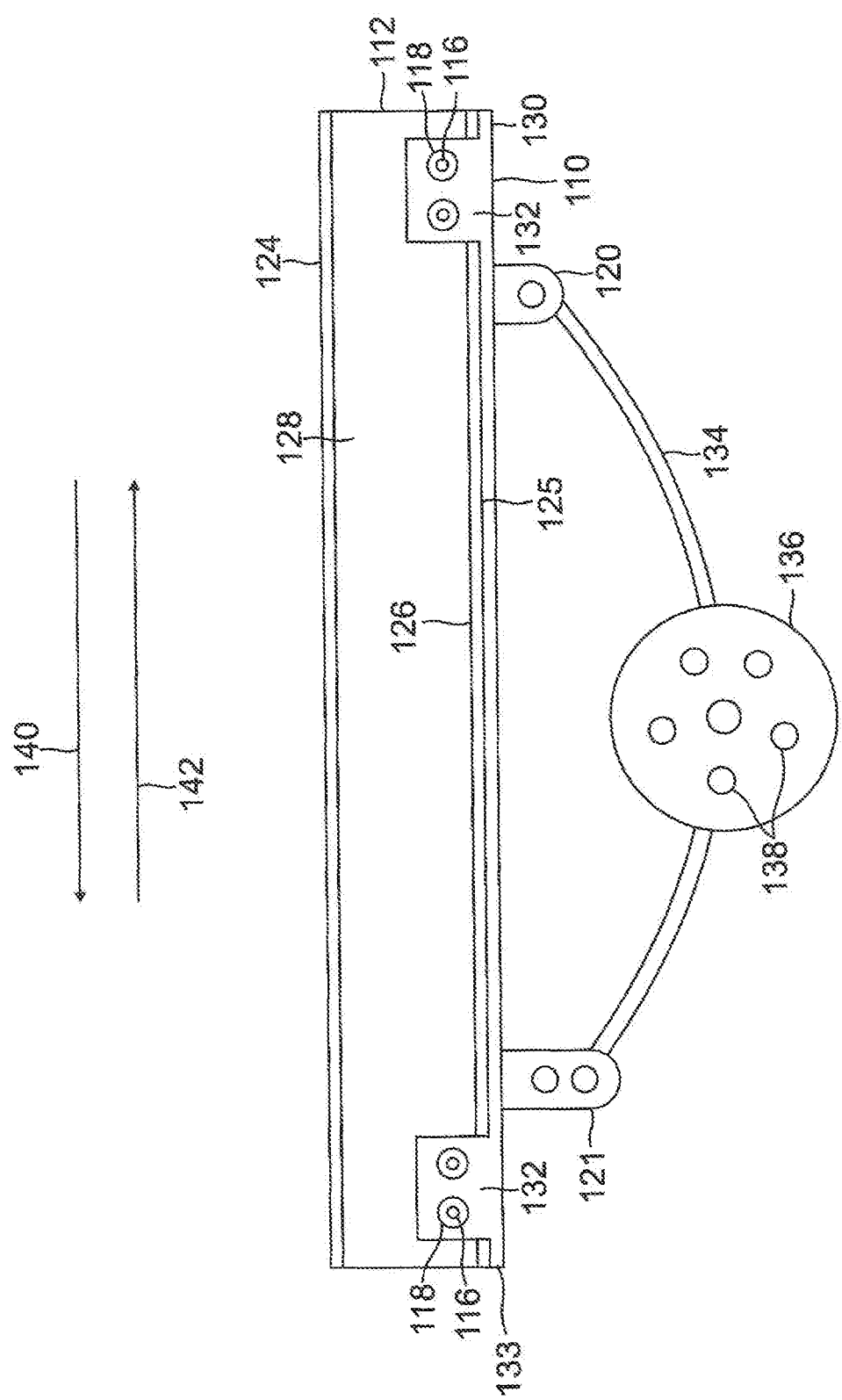
FIG. 4 is a partial side view of a single axle trailer using the clamping system.

FIG. 4 is a partial side view of a single axle trailer using the clamping system of the present invention. As seen in this figure, the undercarriage adapter bottom 130 is in contact with, and extends along, I-Beam bottom 125 between two undercarriage adapter sides 132. Two clamping brackets 101 (not shown) are attached to undercarriage adapter sides 132 using carriage bolts 116 and carriage nuts 118. Attached to front shackle arms 120 and rear shackle arms 121 is leaf spring suspension 134. Lastly, attached to leaf spring suspension 134 is axle 144 (see FIG. 5), which has a wheel hub 136 attached at either end of axle 144. Wheel hub 136 has wheel lugs 138, which are used to attach a tire to the hub 136.

During manufacture of trailer 100, undercarriage 133 may be attached at any location along the length of the trailer 100.

Since this attachment process does not require any welds, the manufacture time of trailer 100 is greatly reduced. Since the I-Beam nature of trailer 100 lends itself well to the use of the clamping system of the present invention, the undercarriage 133 does not need to be located at any one specific place on I-Beam frame 112. Once the final purpose and layout of trailer 100 has been determined, merely loosening clamping screws 114 (see FIG. 3) allows for the undercarriage 133 to be moved either in direction 140 or direction 142 relative to I-Beam frame 112 thereby applying the tongue weight necessary for safe travel. Once the undercarriage is moved to the proper location, clamping screws 114 are again torqued to securely fasten the undercarriage 133 to the I-Beam frame 112.

Figure 5:
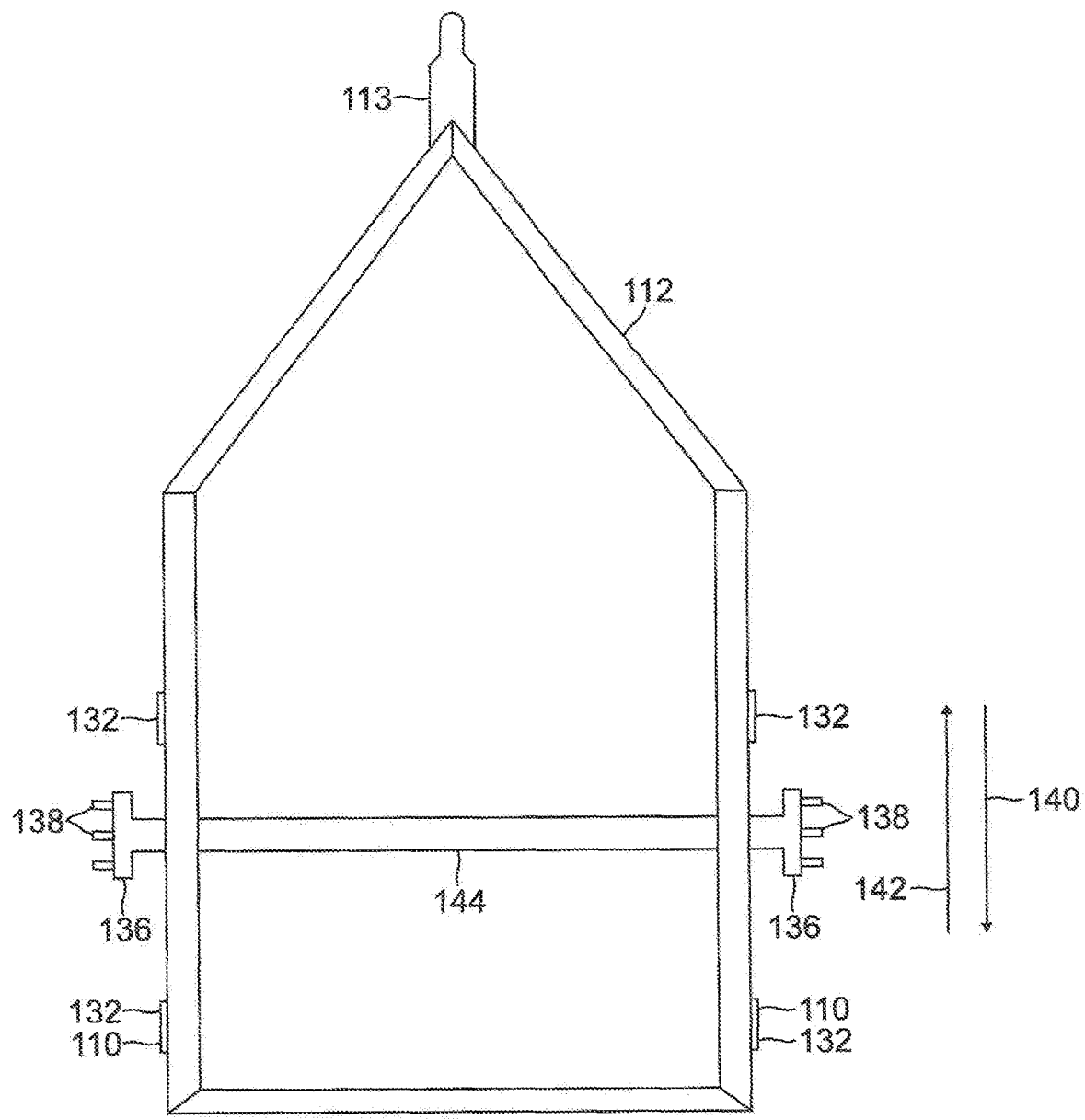
FIG. 5 is a top view of a single axle trailer using the clamping system.

FIG. 5 is a top view of a single axle trailer using the clamping system of the present invention. Axle 144 extends to both sides of I-Beam frame 112. Either during or after initial assembly of trailer 100, if less tongue weight is required, undercarriage 133 is moved in direction 140, thereby shifting more of the weight of trailer 100 off of the tongue 113 to the suspension of undercarriage 133. Conversely, if more tongue weight is needed, undercarriage 133 is moved in direction 142, thereby shifting weight from the suspension of undercarriage 133 to tongue 113.

Figure 6:
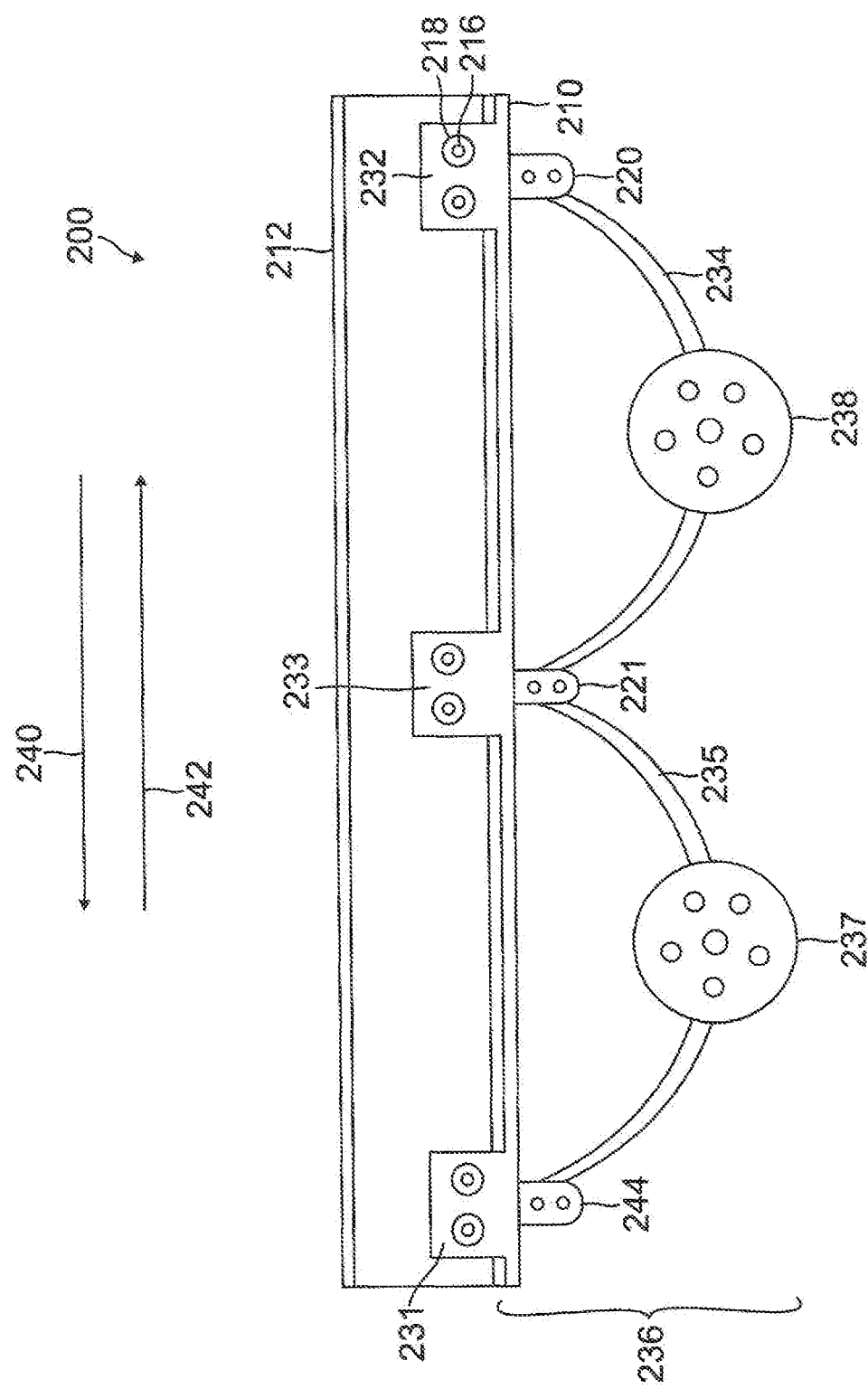
FIG. 6 is a partial side view of a dual axle trailer using the clamping system.

FIG. 6 is an alternative embodiment of the clamping system of the present invention. FIG. 6 is a partial side view of a dual axle trailer and is generally referred to as 200. Similar to trailer 100, trailer 200 uses an I-Beam frame 212. Since there are two axles, undercarriage adapter 210 utilizes three undercarriage adapter sides 231, 232, and 233 and three clamping brackets 101 (not shown) to attach the undercarriage 236 to the I-Beam frame 212.

Leaf spring 234 is attached between front shackle 220 and middle shackle 221 while leaf spring 235 is attached between middle shackle 221 and rear shackle 244. A front axle (not shown), having wheel hub 238 attached to both ends of the front axle, is securely attached to leaf spring 234. A rear axle (not shown), having wheel hub 237 attached to both ends of the rear axle, is securely attached to leaf spring 235. Similar to single axle trailer 100, the tongue weight of trailer can be adjusted by loosening clamping brackets 100 then moving the undercarriage 236 either in direction 240 or direction 242.

It should be appreciated by someone skilled in the art that the clamping system of the present invention can also be used with three or more axle trailers. For example, one side of a three axle undercarriage adapter will have four (4) undercarriage adapter sides and use four (4) brackets.

There are several advantages to using the clamping system of the present invention. The lack of welds required to assemble a frame onto an undercarriage greatly reduces manufacture time. It also maximizes the amount of time a manufacturer can sustain a production run since after an I-Beam is cut to whatever length is needed to form the desired frame size, the undercarriage is quickly mated to the frame without the need for welds. Removing the need for welds, which typically need to be in specific locations on the trailer and whose location can vary from frame size to frame size, allows for longer production runs since specific welding needs are no longer required. Also, as mentioned above, the tongue weight does not need to be perfectly set at the time of manufacture since the clamping system of the present invention allows for a relatively quick and easy process to adjust the position of the undercarriage relative to the frame. This allows a manufacturer to make many trailers during a production run without the need to perfectly set the location of the undercarriage relative to the frame. This method of manufacture is exemplified in FIG. 1.

FIG. 1 illustrates that the I-Beam frame 112 is positioned on the first and second undercarriage adapters 110 and 111 such that the I-Beam frame 112 is inside the undercarriage adapter sides 132 of the first and second undercarriage adapters 110 and 111. The clamping brackets 101 are then bolted into their respective undercarriage adapter sides 132. Lastly, the installation and torqueing of clamping screws 114 completes the assembly process.

This process also allows for a trailer frame 112 to be built out for a specific purpose such as, but not limited to, carrying a boat or a car without the need to mount it to an undercarriage. After the trailer frame 112 is completed, it can be quickly and easily mounted to an undercarriage. Also, if, after a trailer is fully assembled, the intended purpose of a trailer changes such that the load requirements change, the undercarriage 133 can be changed out relatively quickly and easily with a properly sized undercarriage. This may also include changing the number of axles used in the undercarriage. This is made possible since replacing the undercarriage will not require the cutting of any existing welds to remove the existing undercarriage from the trailer frame or the re-welding of the new undercarriage onto the trailer frame. It should be appreciated by someone skilled in the art that the clamping screws may use lock washers, a thread-locking agent such as Loctite™, or any other means commercially available to ensure the clamping screws remain torqued to the proper value throughout the life of the trailer.

Figure 7:
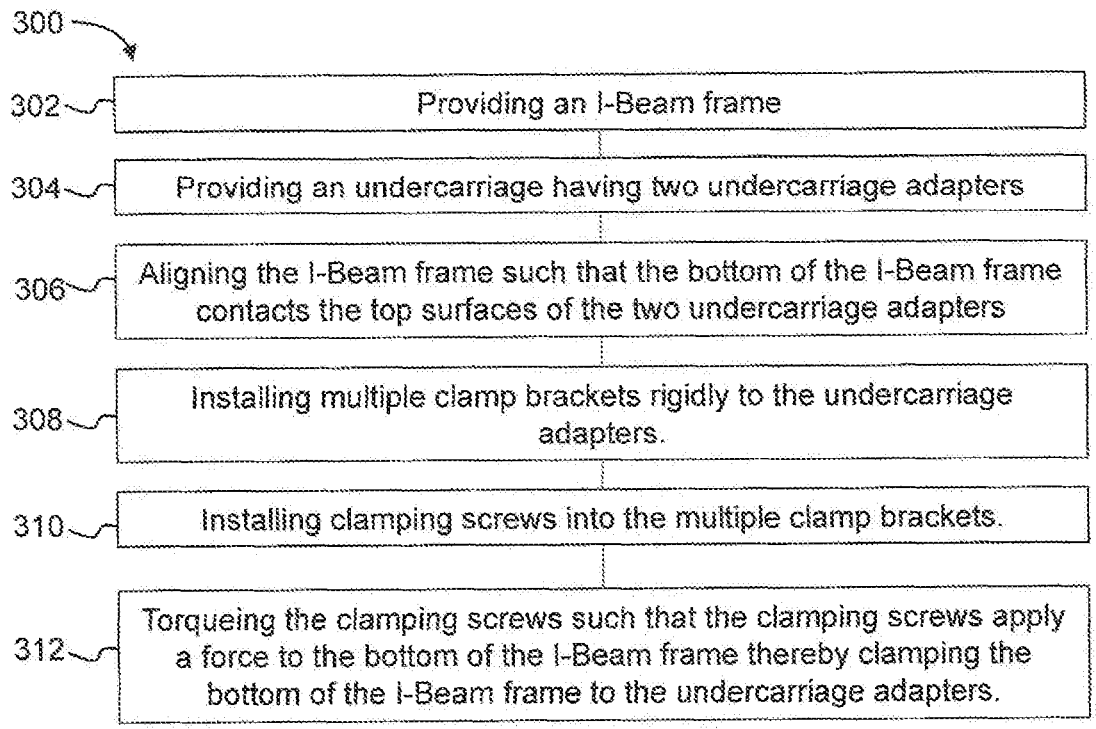
FIG. 7 is a process flow chart illustrating the steps required to assemble an I-Beam frame onto an undercarriage using the clamping system of the present invention.

FIG. 7 is a process flow diagram showing the steps required to assemble a trailer using the clamping system of the present invention and is generally referred to as 300. In step 302, an I-Beam frame is provided. Step 304 provides an undercarriage having two undercarriage adapters. In step 306, the bottom of the I-Beam frame is aligned with the top surfaces of the undercarriage adapters. Step 308 then installs multiple clamping brackets rigidly to the undercarriage adapters. Clamping screws are then installed into the multiple clamping brackets in step 310. Lastly, in step 312, the clamping screws are torqued thereby applying a force to the bottom of the I-Beam frame which in turn clamps the bottom of the I-Beam to the undercarriage adapters.

Figure 8:
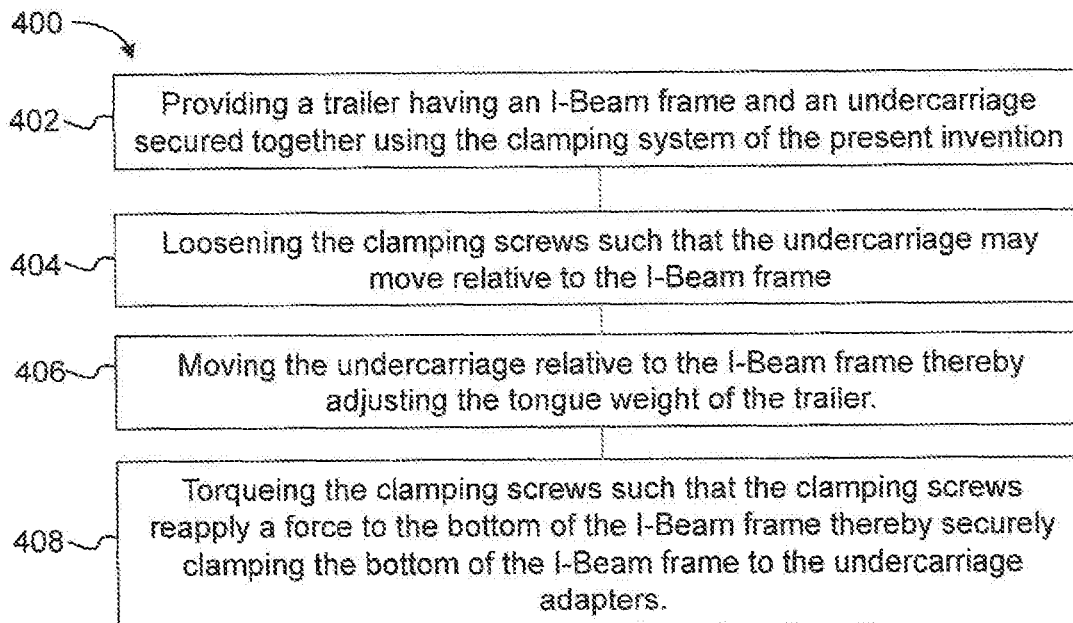
FIG. 8 is a process flow chart illustrating the steps required to adjust the position of the undercarriage relative to the I-Beam frame thereby adjusting the tongue weight of the trailer.

Moving now to FIG. 8, a process flow chart is shown illustrating the steps to adjust the position of the undercarriage relative to the I-Beam frame and is generally referred to as 400. Process 400 starts with step 402, which provides a trailer having an I-Beam frame and an undercarriage secured together using the clamping system of the present invention. In step 404, the clamping screws are loosened such that the undercarriage can move relative to the I-Beam frame. Next, in step 406, the under carriage is moved relative to the I-Beam frame thereby adjusting the tongue weight of the trailer. Lastly, in step 408, the clamping screws are re-torqued to reapply a force to the bottom of the I-Beam frame thereby securely clamping the bottom of the I-Beam frame to the undercarriage adapters.

While there have been shown what are presently considered to be preferred embodiments of the present invention, it will be apparent to those skilled in the art that various changes and modifications can be made herein without departing from the scope and spirit of the invention.

What is claimed is:
1. A clamping system comprising:
a frame having a bottom portion with a bottom surface opposite an inside bottom surface;

one or more clamping brackets each having a first portion and a second portion, wherein the first portion and second portion are disposed at a clamping bracket angle with respect to each other;

an undercarriage adapter having one or more undercarriage adapter sides and an undercarriage adapter bottom formed at an undercarriage adapter angle with respect to the one or more undercarriage adapter sides;

wherein the undercarriage adapter is positioned with respect to the frame so that the bottom portion of the frame is parallel with and in contact with the undercarriage adapter bottom and the one or more clamping brackets are positioned with respect to the undercarriage adapter so that the first portion of the one or more clamping brackets is adjacent to and in contact with the one or more undercarriage adapter sides;

wherein the undercarriage adapter is configured to move laterally relative to the frame;

one or more carriage bolts removably attaching the one or more clamping bracket sides to the one or more undercarriage adapter sides;

wherein the clamping bracket angle and the undercarriage adapter angle are each set to provide that the second portion of the one or more clamping brackets is parallel with and not in contact with the undercarriage adapter bottom;

one or more clamping screws removably received and extending through the second portion of the one or more clamping brackets to contact the inside bottom surface of the bottom portion of the frame, wherein the one or more clamping screws are configured to adjust the distance between the second portion of the one or more clamping brackets and the bottom portion of the frame and to provide force to the bottom surface of the bottom portion of the frame against the undercarriage adapter bottom, separating the second portion of the one or more clamping brackets from the bottom portion of the frame and securing the undercarriage adapter to the frame;

wherein each of the first portion of the one or more clamping brackets is removably connected to at least one of the one or more undercarriage adapter sides and wherein the undercarriage adapter bottom is removably connected to the frame and wherein the tongue weight of the clamping system is adjusted by loosening the one or more clamping screws and modifying the position of the undercarriage adapter relative to the frame.

2. The clamping system of claim 1, wherein the undercarriage adapter is configured to receive a suspension element.

3. The clamping system of claim 2, wherein the undercarriage adapter utilizes a plurality of shackle arms to secure the suspension element to the undercarriage adapter.

4. The clamping system of claim 2, wherein the suspension element is a leaf spring.

5. The clamping system of claim 1, wherein the plurality of undercarriage adapter sides is two and wherein each of the two sides is configured to receive a suspension element.

6. The clamping system of claim 1, wherein the trailer frame is constructed from at least one I-Beam.

7. The clamping system of claim 1, wherein each of the one or more clamping brackets further comprises a threaded riser mounted on the second portion of the clamping bracket in-line with the one or more clamping screws.

8. The clamping system of claim 1, wherein the angle between the first portion and the second portion of the bracket is approximately ninety (90) degrees.

9. A trailer comprising:
a trailer frame having a first side I-Beam, a second side I-Beam, and a tongue located at the front of the trailer frame wherein each I-Beam includes a top portion and a bottom portion connected together by a middle portion with the bottom portion having a bottom surface and an inside bottom surface;

a first undercarriage adapter having one or more first undercarriage adapter sides and a first undercarriage adapter bottom formed at a first undercarriage adapter angle with respect to the one or more first undercarriage adapter sides;

a second undercarriage adapter having one or more second undercarriage adapter sides and a second undercarriage adapter bottom formed at a second undercarriage adapter angle with respect to the one or more second undercarriage adapter sides wherein the number of first undercarriage adapter sides corresponds to the number of second undercarriage adapter sides;

one or more first clamping brackets each having a first portion and a second portion, wherein the first and second portions are disposed at a first clamping bracket angle to each other;

one or more first clamping bracket clamping screws threadably received and extending through the second portion of the one or more first clamping brackets;

one or more second clamping brackets each having a first portion and a second portion, wherein the first and second portions are disposed at a second clamping bracket angle to each other;

one or more second clamping bracket clamping screws threadably received and extending through the second portion of the one or more second clamping brackets;

one or more first side carriage bolts removably attaching the one or more first clamping bracket sides to the one or more first undercarriage adapter sides;

one or more second side carriage bolts removably attaching the one or more second clamping bracket sides to the one or more second undercarriage adapter sides;

wherein the trailer frame is positioned such that the bottom surface of the first side I-beam is located on the first undercarriage adapter bottom and the bottom surface of the second side I-beam is located on the second undercarriage adapter bottom;

wherein the one or more first clamping bracket clamping screws presses the inside bottom surface of the first side I-beam away from the second portion of the one or more first clamping brackets and forces the bottom surface of the first I-beam against the first undercarriage adapter bottom to removably attach the first side I-beam to the first undercarriage adapter; and wherein the one or more second clamping bracket clamping screws presses the inside bottom surface of the second side I-beam away from the second portion of the one or more second clamping brackets and forces the bottom surface of the second beam against the second undercarriage adapter bottom to removably attach the second side I-beam to the second undercarriage adapter.

10. The trailer of claim 9, wherein the first undercarriage adapter is connected to the second undercarriage adapter by an axle.

11. The trailer of claim 9, further comprising a first suspension element mounted to the first undercarriage adapter and a second suspension element mounted to the second undercarriage adapter, and having and axle connected between the first and second suspension elements.

12. The trailer of claim 9, where at least one of the plurality of clamping brackets further comprises a threaded riser mounted on the second portion of the clamping bracket in-line with one or more clamping screws.

13. The trailer of claim 9 wherein the angle between the first portion and the second portion of the bracket is ninety (90) degrees.

14. A clamping system comprising:
- a frame having at least a bottom portion having a bottom surface opposite a top surface;
- a clamping bracket having a first portion formed with one or more carriage bolt holes and a second portion formed with one or more clamping screw holes, wherein the first and second portions are disposed at a clamping bracket angle to each other;
- an undercarriage adapter having at least one undercarriage adapter side formed with one or more carriage bolt holes and an undercarriage adapter bottom formed at an undercarriage adapter angle to each other;
- one or more carriage bolts configured to fit through the one or more carriage bolt holes of the first portion of the clamping bracket and the undercarriage adapter side;
- one or more clamping screws configured to be threadably received and extend through the one or more clamping screw holes of the second portion of the clamping bracket;
- wherein the undercarriage adapter is positioned with respect to the frame so that the bottom portion of the frame is parallel with and in contact with the undercarriage adapter bottom;
- wherein the clamping bracket is positioned with respect to the frame so that the top surface of the frame is parallel with and not in contact with the second portion of the clamping bracket such that the bottom portion of the frame is located between the second portion of the clamping bracket and the undercarriage adapter bottom;
- wherein the clamping bracket angle and the undercarriage adapter angle are each set to provide that the first portion of the clamping bracket is parallel and in contact with the undercarriage adapter side with the one or more carriage bolt holes of the first portion of the clamping bracket and the undercarriage adapter side are aligned together; and
- wherein the first portion of the clamping bracket is removably connected to the undercarriage adapter side by inserting the one or more carriage bolts through the aligned one or more carriage bolt holes of the first portion of the clamping bracket and the undercarriage adapter side and wherein the second portion of the clamping bracket is removably connected to the frame by threading the one or more clamping screws through the one or more clamping screw holes of the second portion of the clamping bracket and torqueing the one or more clamping screws against the top surface of the frame and pushing the bottom portion of the frame away from the clamping bracket and against the undercarriage adapter.

15. The clamping system of claim 14, wherein the frame is an I-Beam frame.

16. The clamping system of claim 14, where the clamping bracket further comprises a threaded riser mounted on the second portion of the clamping bracket in-line with the one or more clamping screw holes.

* * * * *